(12) United States Patent
Laria et al.

(10) Patent No.: US 11,476,575 B2
(45) Date of Patent: Oct. 18, 2022

(54) TRANSMIT ANTENNA CALIBRATION SYSTEM AND METHOD

(71) Applicant: Airbus Defence and Space Limited, Stevenage (GB)

(72) Inventors: Esteban Laria, Portsmouth (GB); Stephen Laws, Portsmouth (GB); Winston Ramsey, Portsmouth (GB)

(73) Assignee: AIRBUS DEFENCE AND SPACE LIMITED, Stevenage (GB)

( * ) Notice: Subject to any disclaimer, the term of this patent is extended or adjusted under 35 U.S.C. 154(b) by 0 days.

(21) Appl. No.: 17/620,173

(22) PCT Filed: Aug. 28, 2020

(86) PCT No.: PCT/GB2020/052065
§ 371 (c)(1),
(2) Date: Dec. 17, 2021

(87) PCT Pub. No.: WO2021/038238
PCT Pub. Date: Mar. 4, 2021

(65) Prior Publication Data
US 2022/0209407 A1    Jun. 30, 2022

(30) Foreign Application Priority Data
Aug. 29, 2019  (GB) .................................. 1912420

(51) Int. Cl.
*H01Q 3/26* (2006.01)
*H04B 7/185* (2006.01)

(52) U.S. Cl.
CPC ......... *H01Q 3/267* (2013.01); *H04B 7/18515* (2013.01)

(58) Field of Classification Search
CPC ..... H01Q 3/267; H04B 7/18515; H04B 17/12
See application file for complete search history.

(56) References Cited

U.S. PATENT DOCUMENTS

| | | |
|---|---|---|
| 5,572,219 A | 11/1996 | Silverstein et al. |
| 5,677,696 A | 10/1997 | Silverstein et al. |
| 6,384,781 B1 | 5/2002 | Kautz et al. |

OTHER PUBLICATIONS

Silverstein; "Application of Orthogonal Codes to the Calibration of Active Phased Array Antennas for Communication Satellites;" Jan. 1, 1997; XP011057676; IEEE Transactions on Signal Processing, IEEE Service Center; New York, NY; vol. 45; No. 1.
Dec. 1, 2020 Search Report issued in International Patent Application No. PCT/GB2020/052065; 4 pp.
Dec. 1, 2020 Written Opinion of the International Searching Authority issued in International Patent Application No. PCT/GB2020/052065; 4 pp.

(Continued)

*Primary Examiner* — Cassi J Galt
(74) *Attorney, Agent, or Firm* — Nelson Mullins Riley & Scarborough LLP (57) ABSTRACT

Disclosed are a calibration system and method for correction of tracking drifts in the output section of a satellite payload and a beamforming network. The disclosed technique exploits characterisation of path gain and phase tracking drifts as deterministic errors that can be measured over spacecraft lifetime without statistical approximations, and thereafter predicted for in-orbit daily temperature variations. Also disclosed is a satellite payload for transmitting test signals to the calibration system.

12 Claims, 3 Drawing Sheets

(56) References Cited

OTHER PUBLICATIONS

Jul. 13, 2021 Written Opinion of the International Preliminary Examining Authority issued in International Patent Application No. PCT/GB2020/052065; 6 pp.
Dec. 8, 2021 International Preliminary Report on Patentability issued in International Patent Application No. PCT/GB2020/052065; 38 pp.
Demand under Article 31 of the Patent Cooperation Treaty (PCT) submitted Jun. 22, 2021 in International Patent Application No. PCT/GB2020/052065.
Response to the Written Opinion of the International Searching Authority submitted Aug. 10, 2021 in International Patent Application No. PCT/GB2020/052065.
Supplemental Response to the Written Opinion of the International Searching Authority submitted Nov. 26, 2021 in International Patent Application No. PCT/GB2020/052065.
Second Supplemental Response to the Written Opinion of the International Searching Authority submitted Nov. 29, 2021 in International Patent Application No. PCT/GB2020/052065.

TRANSMIT ANTENNA CALIBRATION SYSTEM AND METHOD

CROSS-REFERENCE TO RELATED APPLICATIONS

This application claims priority to and is a 35 U.S.C. § 371 U.S. National Stage Application of International Application No. PCT/GB2020/052065, entitled "TRANSMIT ANTENNA CALIBRATION SYSTEM AND METHOD", filed Aug. 28, 2020, which claims priority to British Application No. 1912420.5, entitled "TRANSMIT ANTENNA CALIBRATION SYSTEM AND METHOD", filed Aug. 29, 2019, the contents of each being incorporated by reference herein it is entirety.

FIELD OF INVENTION

The present invention relates to calibration of a beamforming network of a satellite payload, and particularly, but not exclusively, to the use of a control circuit encoding method using Hadamard sequences.

TECHNICAL BACKGROUND

Recently, there has been an increase in flexible designs for telecommunication payloads to allow for an optimisation of satellite resources, including, amongst other features, phased arrays with beamforming capabilities. Whilst phased arrays can provide this level of flexibility, the use of low-power beamforming networks (BFN) in transmission for size and technology rationales entail longer signal paths post-BFN to deliver enough radio frequency (RF) output power, degrading the gain and phase tracking performance between elements, especially at extremely high frequency (EHF) bands. As a consequence, calibration systems become necessary to maintain the desired Equivalent Isotropically Radiated Power (EIRP) over spacecraft temperature and life.

To ensure that the relative gain and phase across all signal paths in an output stage of a satellite payload stays stable from the BFN to the aperture of the feeds, careful design of the common output section (COS) is fundamental, in relation to waveguide and coaxial cable lengths and design, thermal control, repeater phase alignment prior to satellite launch. However, it is impossible to guarantee that the complex gain relationship from BFN input through a long output section will not experience any variation in orbit, over spacecraft life and temperature. Overlooking this issue may reflect on EIRP and isolation performance degradation.

Some elements of gain and phase uncertainty can be assumed to have a random distribution and need to be quantified statistically, to be incorporated in a MonteCarlo analysis to quantify the typical impact on the beam pattern. As the majority of those gain and phase error contributors are independent, in many cases it is possible to apply the central limit theorem in order to derive the standard deviation of the total error. This way address the most likely effect on payload performances in most operational scenarios, assuming that, statistically, the combination of all contributors can be approximated to follow a normal distribution.

Existing publications on calibration systems for satellite communication applications have shown that single-element calibration techniques can take long integration times to provide acceptable measurement accuracy. In addition, whilst COS calibration operations can be used in satellites with active phased arrays to optimise the end-to-end payload performance of all beams, through calibration of antenna elements, such operations do not calibrate the BRN itself. Therefore, the COS calibration may be performed within the context of a variable frame of reference brought about by uncompensated drifts in the BFN performance as a whole.

SUMMARY OF INVENTION

Embodiments of the present invention add to COS calibration systems the ability to re-characterise the performance of the BFN in-orbit for any user beam. This represents a step forward in failure management and maintenance of the quality of service of flexible telecommunication.

Embodiments of the present invention relate to a calibration system for correction of tracking drifts in the output section of a satellite payload and BFN. It exploits characterisation of path gain and phase tracking drifts as deterministic errors that can be measured over spacecraft lifetime without statistical approximations, and thereafter predicted for in-orbit daily temperature variations, thanks to an operational payload calibration procedure according to the embodiments described below.

According to an aspect of the present invention, there is provided a calibration method for characterising a beamforming network of a satellite payload, comprising: receiving a reference signal and an encoded signal from the satellite payload, wherein the reference signal corresponds to a calibration signal, and the encoded signal comprises a sequence of signals defined by the application of an orthogonal, bipolar, invertible matrix to the calibration signal, wherein the matrix is arranged to sequentially toggle each of a plurality of settings for the beamforming network; performing a calibration $3\sigma$ procedure by determining the gain and phase difference between the reference signal and the encoded signal for each of the sequence of signals in the encoded signal, and applying the inverse matrix to the determined complex gain and phase differences to provide a decoded signal representing the effect of toggling of each beamforming network setting on the complex gain and phase differences; applying an offset to one or more of the beamforming network settings and repeating the calibration procedure to output a characterisation of the beamforming network as a sensitivity to changes in beamforming network parameters.

The calibration method may comprise executing a synchronisation routine in order to determine when to start the calibration procedure.

The calibration method may comprise observing a pseudo-random sequence in the encoded signal.

The calibration method may comprise correcting for gain and phase drift in the beamforming network by adjusting one or more parameters of the beamforming network in accordance with the sensitivity.

According to another aspect of the present invention, there is provided a computer program which, when executed by one or more processors, is arranged to cause a ground station having a transmitter, a receiver, and the one or more processors, perform the above calibration method.

According to another aspect of the present invention, there is provided a satellite payload comprising: an array of transmit elements; a calibration tone generator; and one or more beamforming networks arranged to control the array of transmit elements in accordance with a plurality of settings; wherein the transmit array is arranged to transmit, to a calibration system: a reference signal corresponding to a calibration signal generated by the calibration tone generator; and an encoded signal comprising a sequence of signals defined by the application of an orthogonal, bipolar, invertible matrix to the calibration signal, wherein the matrix is arranged to sequentially toggle each of a plurality of settings of the one or more beamforming networks; wherein the one or more beamforming networks are arranged to apply an offset to one or more of the settings in dependence upon a control signal received from the calibration system based on the gain and phase difference between the reference and encoded signals received by the calibration system.

The transmit array may be arranged to output a pseudo-random sequence in the encoded signal for synchronisation with the calibration system.

According to another aspect of the present invention, there is provided a system comprising a calibration system for performing the above calibration method, and the satellite payload, wherein the calibration system comprises a receiver for receiving the reference signal and the encoded signal from the satellite payload; a processor arranged to determine the gain and phase difference between the reference signal and the encoded signal for each of the sequence of signals in the encoded signal, and to apply the inverse matrix to the determined complex gain and phase differences to provide a decoded signal representing the effect of toggling of each beamforming network setting on the complex gain and phase differences; wherein the processor is arranged to apply an offset to one or more of the beamforming network settings and to repeat the calibration procedure to output a characterisation of the one or more beamforming networks a sensitivity to changes in beamforming network parameters.

Embodiments of the present invention rely on the control circuit encoding (CCE) technique, whereby the payload is commanded from the ground to transmit a spread-spectrum Ku-band signal via a sequence of orthogonal path gain and phase shifts, with no interruption of user traffic. This signal is coherently detected by a dedicated calibration ground station that locks to a sophisticated synchronisation sequence and provides the measured I/Q components to a software tool for decoding of the received vectors and correction of BFN coefficients, allowing for compensation for the calculated tracking drifts.

The signal synchronisation approached presented is an innovative solution to achieve a resilient calibration system based on a far field link between a geostationary satellite and a ground station. In analogue architectures, the ground-based solution according to the present invention suggests key advantages such as mass, reliability and accessibility to the measurement equipment in case of failures. Measurement times can be up to eight times lower than those used in previous work.

BRIEF DESCRIPTION OF DRAWINGS

Embodiments of the present invention will be described by way of example only, with reference to the accompanying drawings, in which.

DETAILED DESCRIPTION

Figure 1:
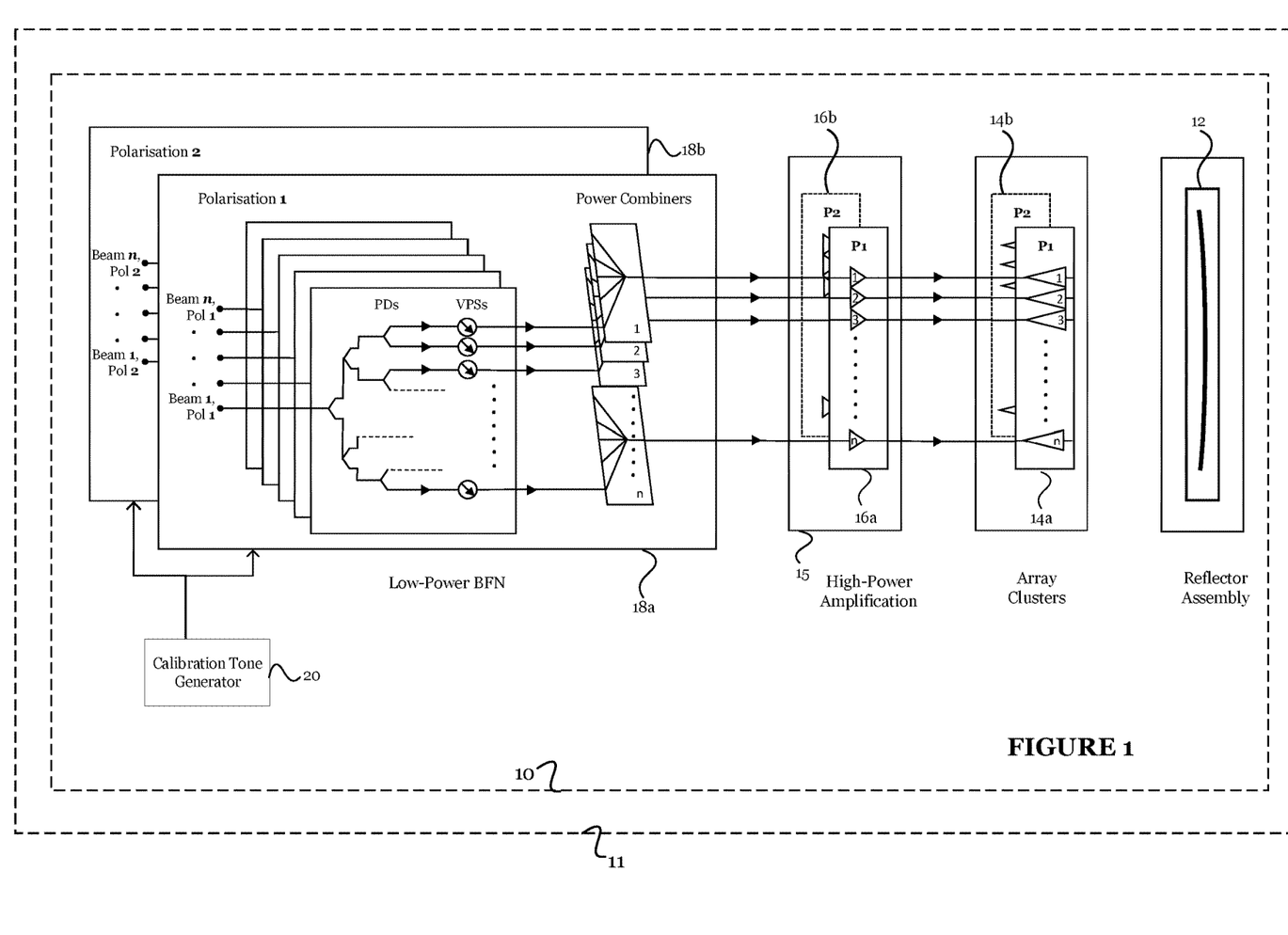
FIG. 1 illustrates a functional block diagram of the of the output section for a transmit array in a satellite payload, according to embodiments of the present invention.

A functional block diagram of the output section 10 for a satellite payload 11, according to embodiments of the present invention, is shown in FIG. 1. The output section 10 comprises a reflector assembly 12, and two transmit arrays 14a, 14b arranged as clusters of antenna feeds, one for each of two signal polarizations (for example, horizontal and vertical). Attached to each transmit array 14a, 14b is a high-power amplification section 15 comprising, for example, respective arrays 16a, 10 of amplifiers. Amplified signals are combined in a low-power BFNs 18a, 18b (one per polarisation) for output from the output section 10.

In the present embodiments, the payload 11 is software-defined with full flexibility: frequency plan, channelization, uplink to downlink connectivity and flexible coverage. Its downlink coverage is formed of n beams of orthogonal polarisations, n−1 of them being used for payload traffic transmission and one for the calibration system to be described below.

The flexibility in coverage definition is provided by the transmit array 14a, 14b, and particularly by the transmit BFNs 18a, 18b. The BFNs 18a, 18b are analogue low-power units that benefit from a compact, low mass design, with internal digital variable gain and phase shifters (VAPs) that provide the capability to apply gain and phase variations in each path of the payload output section 10, which is common to all transmit beams in each polarisation. The VAPs comprise power dividers (PDs), variable phase shifters (VPSs), and power combiners.

The gain and phase adjustments performed on each VAP of a BFN beam by the calibration system allow for reshaping and repointing of the transmit beam. However, as the beam weights, at array level, define the beam, it is necessary to ensure that the coefficients uploaded to the BFN 18a, 18b track well across all paths of the payload output section 10, which includes the high power amplification 15. The calibration procedure of the present embodiments makes use of the BFN gain and phase adjustment functionality and the "spare" $n^{th}$ beam on each polarisation to address this issue, to calculate any drifts in the COS and apply the corrections at BFN level.

A CCE calibration method allows for all paths in the output section 10 to be measured simultaneously, and enables a high signal-to-noise ratio. CCE uses orthogonal, bipolar code sequences to control the state of the VAPs inside the BFNs 18a, 18b for a calibration beam, typically defined by a Hadamard matrix, as it is invertible and bipolar. In alternative embodiments, any orthogonal, invertible and bipolar matrix can be used, in conjunction with an orthogonal code sequence so that the process can be inverted and measurements for each individual path can be derived. Each value in the code sequence defines the state of a cardinal bit in one of the paths. A Hadamard sequence of size equal or higher than the number of array elements ensures that every path takes a 'high' and 'low' state for the bit used during the calibration sequence at least once, allowing for separation of the individual path contributions at the calibration system by decoding, with the application of the inverse matrix, the received complex vectors.

In the present embodiments, the source of the calibration signal is an on-board calibration tone generator (CTG) 20, routed to the spare beam of both BFNs 18a, 18b, split so that there is one calibration signal in each polarisation. One polarisation transmits a reference signal and the other polarisation transmits a sequence of 'encoded' signals as defined by the Hadamard matrix. The reference signal can be considered as static with respect to the encoded signal. The complex gain difference between the two signals is then measured in the calibration method. The use of a reference signal generated by the same coherent source and with no modifications of the BFN 18*a*, 18*b* or output section 10 gain/phase parameters throughout the calibration sequence allows for compensation of any temporal changes (e.g. atmospheric), since as long as measurements of the calibration sequence are taken rapidly, any downlink variations are assumed to affect equally the signals from both polarisations, so the relative ratio between both received signals is the same.

The initial calibration coverage is based on beam weights calculated by "best-fitting" of the gain and phase constellation provided by the BFN 18*a*, 18*b* flexible settings. The application of the Hadamard matrix for commutation of a cardinal gain or phase bit of every VAP generates a series of new coverages to be uploaded to the BFN 18*a*, 18*b*. The sequential transmission of the calibration signal for each of those coverages allows for measurement of the received I/Q components. The complete system presents full flexibility for customisation of the dwell times for each gain and phase change in the calibration sequence at BFN level, and consistent flow-down to the expected time slots in the calibration system.

The calibration signal is generated by binary phase shift keying (BPSK) modulation of a tone within the transmit band generated by the CTG 20. The data modulating this carrier is a pseudorandom sequence at a high data rate, generated by the spacecraft on-board computer. This modulation allows for spectrum spreading, meaning that the radiated power at the frequency of the calibration tone is lower because it is distributed in secondary lobes. For a user channel, the calibration signal could be considered as an in-band spurious signal, if the signal is a continuous wave. Thanks to spectrum spreading, performance can be maintained with a lower power-flux density (PFD) in very narrow bands, while keeping the total calibration EIRP.

A calibration system performing a calibration method according to embodiments of the present invention receives the RF reference and encoded signals and downconverts them to intermediate frequency (IF), after separating the two polarisations, to feed them into two identical software-defined receivers (SDR). These devices extract the instantaneous amplitude and phase of the two signals in each time slot and pass them to a server running calibration software.

The calibration system may be embodied in a ground station, or may be embodied on-board the satellite payload 11, or a different satellite payload. When embodied in the ground station, the calibration system may be achieved by installing a computer program, or software on one or more processors or controllers of a general-purpose ground station, which causes the ground station to be configured to receive the reference and encoded signals and performs the calibration routine to be described below. In this regard, the computer program or software may stored on recording medium, such as a disk, or bay be downloaded from a server or from a cloud computing network.

In alternative embodiments, such as where the calibration system is a component on-board the satellite payload 11 arranged so as to be able to receive the reference and encoded signal, the calibration system comprises receiver, transmitter and processing components which are either pre-configured, or configured in-orbit, to perform the calibration routine to be described below.

The calibration method according to embodiments of the present invention includes calculation of the relative gain and phase difference between the reference and encoded signal in each time slot and performance of multiple sampling and averaging for transmission of the complex vectors for each Hadamard matrix slot to the calibration module that applies the inverse Hadamard matrix to decode the path components.

For the calibration system to know when the measurement acquisition should start in the two receive paths, such that relative gain and phase values can be determined for every Hadamard hop, a synchronisation sequence in the encoded signal may be required in embodiments in which the calibration system is implemented in a ground station not previously coupled to the satellite payload 11. (In the case where the ground station is a coherent receiver with respect to the signal source, and where timings are well known, a synchronisation routine can be avoided). Synchronisation is based on correlation of the received vector and relative gains and phases between the encoded and reference signals, and an expected vector, based on a pseudorandom sequence.

In detail, in some embodiments synchronisation is done with a pseudo-random sequence of quadrature phase shift keying (QPSK) phase changes to the initial BFN steps of every path for beam pointing to the calibration system, with constant amplitude BFN steps for every path. These series of hops are commanded to the BFN and known by the calibration system, and they can be seen from the calibration system as a low data rate phase 'modulation' of the calibration signal which, as previously described, is already modulated in BPSK at a high data rate. There is no information carried in this 'modulation', but a variation of the relative phase in each hop of the calibration sequence with respect to the phase of the reference signal received simultaneously in the opposite polarisation, by modifying the state of the phase shifters for each path through the BFN. The calibration system detects those phase changes in the I/Q constellation of the encoded signal with respect to the reference signal. Once a full calibration synchronisation sequence is received, the calibration system starts acquiring measurements.

The use of two signals in opposite polarisations for calculation of the relative gain and phase between the two of them in each time slot implies some complications. A significant one is the maintenance of the phase stability between the two received paths, as any drift between them during the calibration sequence will give misleading results. Besides the careful design of the coaxial cables in the two paths, the RF to IF downconversion stage with two separate equipments, even with a common frequency source, need very accurate phase coherence to keep long term phase stability across the whole Hadamard sequence. Shorter dwell times, such as a few milliseconds (e.g. 2.5 ms), with multiple repetitions of the same calibration sequence, are used. The calibration system acquires those multiple repetitions to average them and provide the final values to the calibration software. Thanks to those short dwell times, the long term phase stability issue becomes irrelevant, and the signal-to-noise ratio is kept at the wanted level as, for the purpose of reducing the effect of thermal noise, the averaging across calibration sequences is equivalent to a single sequence with longer dwell times.

To avoid losing synchronisation with a calibration system implemented in a ground receiver, the repetition of Hadamard sequences for multiple averaging is done in two ways: inside the calibration sequence $\alpha$ times (formed of both synchronisation and Hadamard time slots), and across $\beta$ sequences (i.e. by repetition of the same sequence several times, implying re-synchronisation on the ground), leading to an $\alpha*\beta$ increase of the dwell time of each hop, for higher averaging and signal-to-noise ratio. In this configuration, $\alpha$ and $\beta$ are both $\geq 1$.

Figure 2:
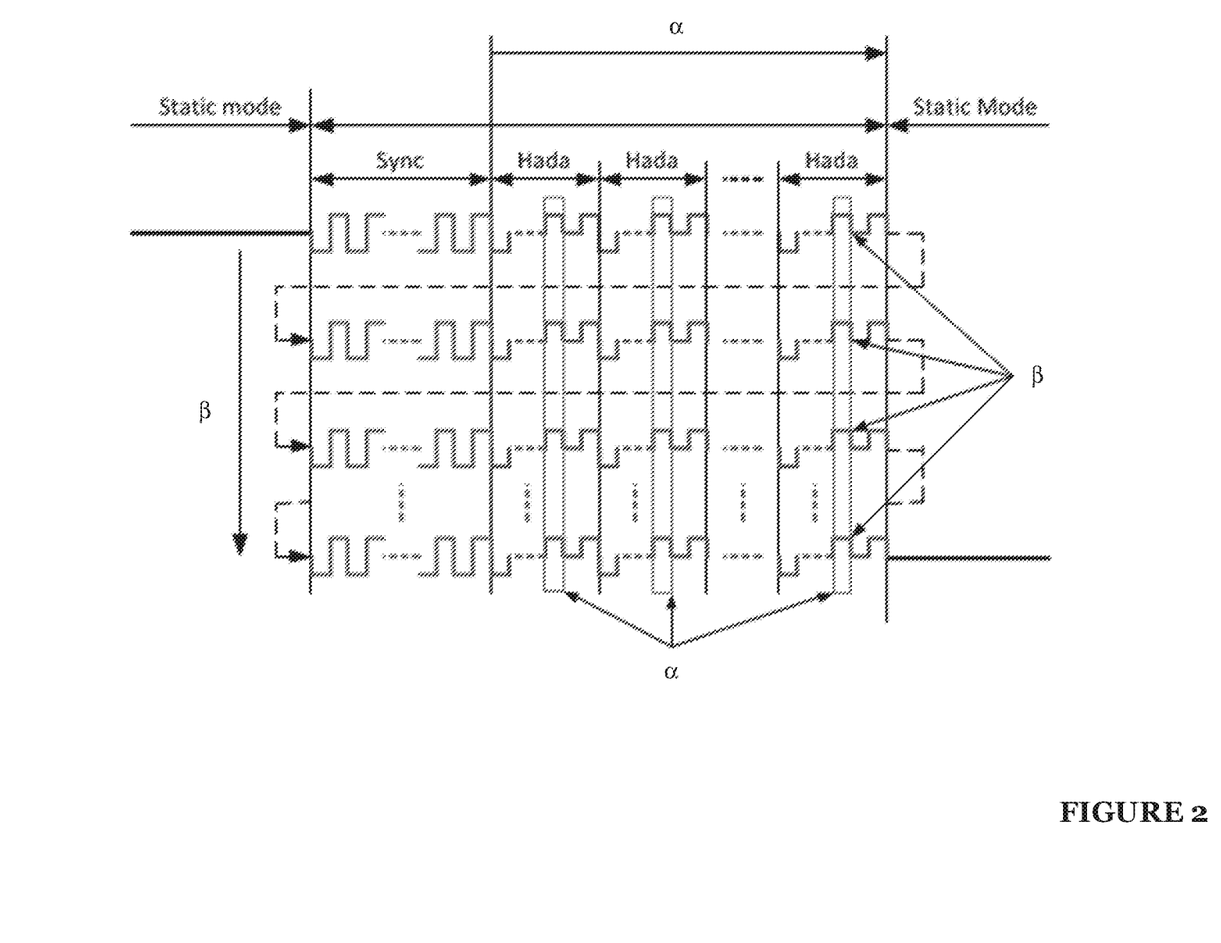
FIG. 2 illustrates the concept of $\alpha*\beta$ averaging of Hadamard hops within and across calibration sequences, as employed in embodiments of the present invention.

This concept is depicted in FIG. 2, for an undefined amount of synchronisation and Hadamard hops in the calibration sequence. FIG. 2 shows a sequence to be included in the encoded signal, comprising a synchronisation stage, prior to α Hadamard sequences. For ease of explanation, the continuing sequence is shown in the Figure as a new cycle underneath the previous cycle, with the new cycle including a further synchronisation stage, and α further Hadamard sequences. In total, β synchronisation/Hadamard cycles are shown.

As part of the flexible approach used in the present embodiment, the parameters defining the calibration sequence can be modified by the operator on a software tool that communicates with both the spacecraft and the calibration system. In other words, there is the possibility of modifying inputs such as the synchronisation sequence, dwell times of the calibration sequence time slots, number of averages to be performed (α and β settings), transmit frequencies at which the calibration routine is performed, etc.

Whilst optimum parameters can be derived through analysis and testing, this flexibility allows use of information collected from initial in-orbit calibrations to detect potential patterns in the daily variations over frequency and temperature at the COS, and optimise the operational routine for either more thorough or faster executions.

COS Calibration

The COS calibration routine of embodiments of the present invention allows for detection of gain and phase drifts in any of the paths of the output section 10 of the payload 11.

During COS calibration, a number of M BFN settings for the polarity under test are derived by applying the Hadamard matrix to the chosen 'toggling bit' of the reference BFN settings for pointing to the calibration system, M being the order of the Hadamard matrix. The optimum toggling bit for COS calibration is derived from a trade-off of contributors to the calibration system overall performance, i.e. thermal noise, intermodulation products from payload user traffic, cross-polar discrimination between the two signals transmitted in opposite polarities, acquisition time required, sizing of a ground antenna and receive system, etc. The use of phase toggling bits, especially if these are the most significant ones, imply significant beam steering throughout the Hadamard sequence, reducing the directivity in each of the time slots. On the other hand, the use of gain toggling bits implies a variation of the repeater output power. As the Hadamard matrix sequence applies a change of state of the toggling bit in the BFN for each path, whether this implies an increase or a decrease in gain depends on what the original state was. A high increase in repeater output power may lead to exceeding PFD limits specified in ITU regulations; whilst a high decrease will reduce the signal-to-noise ratio of the received calibration signal, particularly when received on the ground.

Each of the M measurements is made within the length of the associated hop in the BFN beam switching sequence. Each measurement is a summation of the element transfer functions:

$$Meas(m, f) = \sum_{e=1}^{E} a(e, f) \cdot H(e, m) = \sum_{e=1}^{E} [b(e, h, k, f) \cdot COS(e, f) \cdot D/L(e, f)] \cdot H(e, m)$$

where:
e is element in the array (1 ... E)
f is the frequency at which the calibration signal is set to
Meas(m,f) is the measurement corresponding to the m-th Hadamard sequence (m=1 ... M) at the calibration frequency
h is the BFN attenuation setting for the reference coverage
k is the BFN phase setting for the reference coverage
a(e,f) is the reference transfer function for the end-to-end system, i.e. the $S_{21}$ parameter from BFN input through BFN, COS and space link down to Earth at the measurement plane
H(e,m) is each element of the Hadamard matrix
b(e, h, k, f) is the reference BFN transfer function for each element at the calibration frequency
COS(e,f) is the Common Output Section error for each element at the calibration frequency
D/L(e,f) is the 'far field' path transfer function for each element at the calibration frequency A 'decoded' array at a given calibration frequency is derived by applying the inverse Hadamard matrix to the received composite vectors of measurements, as follows:

$$\overline{\overline{H^{-1}}} \cdot \begin{bmatrix} Meas(1, f) \\ \ldots \\ Meas(M, f) \end{bmatrix} = \begin{bmatrix} a(1, f) \frac{1 - d(1, f)}{2} \\ \ldots \\ a(E, f) \frac{1 - d(E, f)}{2} \end{bmatrix}$$

where d(e,f) is the difference between the BFN complex gain for each element at a given frequency between the reference setting and after toggling the chosen VAP bit as per the Hadamard matrix:

$$d(e, f) = b(e, h_{toggled}, k, f) - b(e, h, k, f)$$

Therefore, a(e,f) can be obtained. As this is a transfer function formed by the insertion gain and phase of the BFN, the COS and the space downlink as relative values between paths, the COS contribution can be calculated, as the BFN performance is known a priori from equipment and payload test results at different temperature profiles, and the relative phase difference between paths from each feed can be calculated as part of the antenna model based on geometry of the array 14a, 14b and the reflector 12.

The COS relative gain and phase between paths are used by a best-fit algorithm, which calculates a new set of BFN configurations that compensate for the drifts seen by the last COS calibration run. Periodic execution of the COS calibration system throughout the day allows for correction of gain and phase tracking drifts between paths, as well as antenna beam pointing errors, minimising the allowing to maintain the EIRP and isolation performance throughout the mission for all beams.

Full BFN Calibration

The COS calibration procedure works under the assumption that the BFN performance is in line with equipment and payload test results, as it is a highly stable equipment. However, in the unlikely scenario in which the BFN shows an unexpected or faulty performance, or to assess any lifetime absolute amplitude and phase changes within the BFN VAPs, a full BFN calibration procedure is implemented in embodiments of the present invention. This routine works on any downlink beam, requiring the re-routing of traffic to the spare beam if a user beam needs to be calibrated. The full BFN calibration can be run in two modes: BFN fault finding (for detection of any drift in the performance of the BFN VAPs, done by assessment of the $S_{21}$ parameters associated to the VAP cardinal bits) and BFN database repopulation (for re-characterisation of the BFN insertion gain and phase for specific BFN settings and paths that have shown an unexpected performance as indicated by the BFN fault finding routine).

The full BFN calibration can be seen as two separate COS calibration executions, with a mathematical relationship between both. The first step is to, as for COS calibration, toggle a selected BFN cardinal bit (noted x bit hereafter) as instructed by the Hadamard sequences, and applying at the calibration system the inverse Hadamard to the received complex measurements to give a decoded array $z_1(e)$:

$$z_1(e, f) = Meas_1(m, f) \cdot H^{-1}(e, m) = \frac{1}{2}(1 - d^x(e, f))a(e, f)$$

where $d^x(e,f)$ is the difference between the BFN complex gain for each element at a given frequency between the reference setting and after toggling bit x.

The second step is to apply an offset (noted y) to the reference BFN gain or phase settings for initial pointing to the calibration system to a number of paths, and repeat the application of the Hadamard matrix to the x toggling bit as done previously, bits, thereafter applying the inverse Hadamard matrix to the received complex measurements to give a second decoded array $z_2(e)$:

$$z_1(e, f) = Meas_2(m, f) \cdot H^{-1}(e, m) = \frac{1}{2}(1 - d^x(e, f))d^y(e, f)a(e, f)$$

where $d^y(e,f)$ is the difference between the BFN complex gain for each element at a given frequency between the reference setting and the setting with a y offset of BFN gain or phase coefficients The decoded arrays $z_1$ and $z_2$ are processed to identify the real change of gain and phase due to the application of the y offset, by complex division of the two:

$$\tilde{d}^y(e) = \frac{z_2(e)}{z_1(e)}$$

The offset is applied via transmission of a control signal, or series of telecommands, to the BFN from the calibration system. An on-board controller at the BFN translates the received signal into the protocol used by the BFN electrical interface to update the BFN settings stored in the BFN memory for each coverage.

The output of the calibration method is a characterisation of one or more of the beamforming networks of the satellite payload in terms of sensitivity to changes in beamforming network parameters. Put another way, gain and phase tracking drifts of output sections of the satellite payload can be characterised in a deterministic manner.

With such a characterisation, it is possible to correct for gain and phase drifts in the payload output section or in the BFN based on adjustment of one or more parameters, with an accuracy that allows maintaining the EIRP of the transmit antenna array over life and temperature variations in this flexible spacecraft. The corrections can be performed automatically by an on-board controller of the satellite, and information relating to the corrections performed may be transmitted via the downlink to user equipment on the ground, to enable diagnostic information to be collected and tracked. Alternatively, information relating to gain and phase drifts, and a characterisation of the BFN sensitivity, can be provided to the user equipment, so that the user can manually, or via a dedicated ground station, perform the required corrections.

In this manner, the calibration method of embodiments of the present invention can show great benefits for payload operation, as it allows detecting residual errors from the gain and phase alignment activities and identifying the reason for unexpected beam shapes during antenna pattern tests, for these to be corrected electrically with initial COS drifts to be considered in the beam weight optimisation for every coverage used in-orbit thereafter, hence avoiding costs due to further investigations during assembly, integration and testing (AIT) operations.

Figure 3:
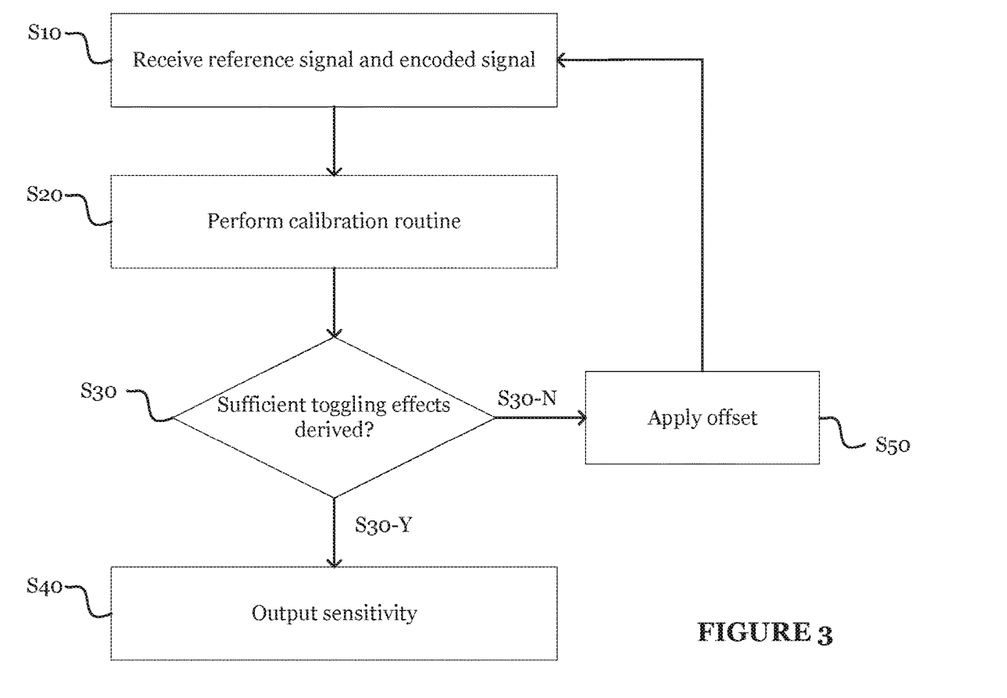
FIG. 3 illustrates a calibration method according to embodiments of the present invention.

FIG. 3 illustrates a calibration method according to some embodiments of the present invention. As described above, the calibration method is performed using either a ground-based or a space-based calibration system.

In step S10, a reference signal and an encoded signal are received. The reference signal corresponds to a calibration signal, and the encoded signal comprises a sequence of signals defined by the application of an orthogonal, bipolar, invertible matrix to the calibration signal, wherein the matrix is arranged to sequentially toggle each of a plurality of settings for the beamforming network.

In step S20, a calibration procedure is performed by determining the gain and phase difference between the reference signal and the encoded signal for each of the sequence of signals in the encoded signal, and applying the inverse matrix to the determined complex gain and phase differences to provide a decoded signal representing the effect of toggling of each beamforming network setting on the complex gain and phase differences.

In step S30 it is determined whether sufficient effects of toggling each beamforming network setting have been derived to be able to characterise the beamforming network as sensitivity to changes in beamforming network parameters. If the beamforming network can be so characterised (S30—Y), the method proceeds to step S40 and the characterisation is output, so that corrections can be performed as described above. If sufficient effects have not been derived (S30—N), the method proceeds to step S50.

In step S50 offset to one or more of the beamforming network settings is applied by provision of a control signal to the satellite payload. The process returns to step S10, and the calibration procedure in step S20 is performed in relation to a modified encoded signal which is received in step S10. The modification of the encoded signal is in accordance with the change in the beamforming network setting caused by the offset applied in step S50.

Figure 4:
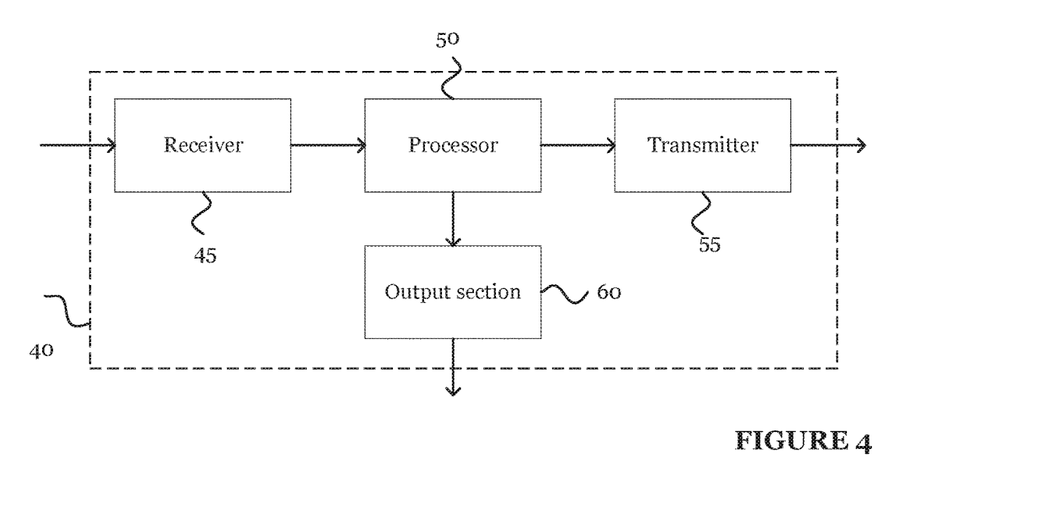
FIG. 4 illustrates a calibration system according to embodiments of the present invention.

FIG. 4 illustrates a calibration system 40 according to some embodiments of the present invention. The calibration system comprises a receiver 45 for receiving the reference and encoded signal. The calibration system 40 further comprises a processor or processing module 50 for performing at least the calibration procedure described in relation to step S20 of FIG. 3. The calibration system further comprises a transmitter 55 for transmitting a control signal to the satellite payload instructing application of an offset to one or more of the beamforming network settings at the satellite payload. An output section or module 60 outputs a characterisation of the beamforming network as sensitivity to changes in beamforming network parameters. As described above, this characterisation may be output to the satellite payload, or to a ground station.

It will be appreciated from the above description that a number of specific implementations of the calibration method and system are possible which fall within the scope of the present invention as defined by the claims. For example, the nature of the matrix used, the nature of the settings of the beamforming network to be characterised, and content of the reference signal, and the physical location of the calibration system may all be varied without departing from the scope of the present invention.

The invention claimed is:

1. A calibration method for characterising a beamforming network of a satellite payload, comprising:
   receiving a reference signal and an encoded signal from the satellite payload, wherein the reference signal corresponds to a calibration signal, and the encoded signal comprises a sequence of signals defined by the application of an orthogonal, bipolar, invertible matrix to the calibration signal, wherein the matrix is arranged to sequentially toggle each of a first plurality of settings of the beamforming network;
   performing a calibration procedure by determining the relative gain and phase difference between the reference signal and the encoded signal for each of the sequence of signals in the encoded signal to derive a composite vector of measurements, and applying the inverse matrix to the composite vector of measurements to provide a first decoded signal representing the effect of toggling of each of the first plurality of settings of the beamforming network on the complex gain differences;
   applying an offset to one or more of the first plurality of settings of the beamforming network to derive a second plurality of settings of the beamforming network;
   applying the orthogonal, bipolar, invertible matrix to the calibration signal, wherein the matrix is arranged to sequentially toggle each of the second plurality of settings of the beamforming network and repeating the calibration procedure to output a second decoded signal representing the effect of toggling of each second plurality of beamforming network settings on the complex gain differences; and
   outputting a characterisation of the beamforming network as sensitivity to changes in beamforming network parameters as a ratio between the first and second decoded signals.

2. A calibration method according to claim 1, wherein:
   the first decoded signal $z_1(e,f)$ for element e of the beamforming network, at frequency f, is represented by:

$$z_1(e, f) = 1/2(1 - d^x e, f)) \cdot a(e, f);$$

the second decoded signal, $z_2(e,f)$ is represented by:

$$z_2(e, f) = 1/2(1 - d^x(e, f)) \cdot d^y(e, f) \cdot a(e, f),$$

and the sensitivity, $\tilde{d}^y(e)$, to changes in beamforming network parameters is represented by:

$$\tilde{d}^y(e) = \frac{z_2(e)}{z_1(e)}$$

wherein $d^x(e,f)$ is the difference of the complex gain of the beamforming network between a reference setting and after toggling bit x of the matrix, $d^y(e,f)$ is the difference of the complex gain of the beamforming network between the reference setting and the setting with a y offset to a gain or phase coefficient in the second plurality of settings; and $a(e,f)$ is a reference transfer function for a system comprising the satellite payload and its downlink.

3. A calibration method according to claim 1, comprising executing a synchronisation routine in order to determine when to start the calibration procedure.

4. A calibration method according to claim 1, comprising observing a pseudo-random sequence in the encoded signal.

5. A calibration method according to claim 1 comprising correcting for gain and phase drift in the beamforming network by adjusting one or more parameters of the beamforming network in accordance with the sensitivity.

6. A non-transitory computer readable medium comprising instructions which, when executed by one or more processors, causes a ground station having a transmitter, a receiver, and the one or more processors to perform a calibration method according to claim 1.

7. A calibration system for performing a calibration method to characterise a beamforming network of a satellite payload, wherein the calibration system comprises:
   a receiver for receiving a reference signal and an encoded signal from the satellite payload, wherein the reference signal corresponds to a calibration signal, and the encoded signal comprises a sequence of signals defined by the application of an orthogonal, bipolar, invertible matrix to the calibration signal, wherein the matrix is arranged to sequentially toggle each of a first plurality of settings of the beamforming network; and
   a processor arranged to perform a calibration procedure by determining the relative gain and phase difference between the reference signal and the encoded signal for each of the sequence of signals in the encoded signal to derive a composite vector of measurements, and to apply the inverse matrix to the composite vector of measurements to provide a first decoded signal representing the effect of toggling of each of the first plurality of settings of the beamforming network setting on the complex gain differences;
   wherein the processor is arranged to apply an offset to one or more of the first plurality of settings of the beamforming network to derive a second plurality of settings of the beamforming network, to apply the orthogonal, bipolar, invertible matrix to the calibration signal, wherein the matrix is arranged to sequentially toggle each of the second plurality of settings of the beamforming network, and to repeat the calibration procedure to output a second decoded signal representing the effect of toggling of each second plurality of beamforming network settings on the complex gain differences;

wherein the processor is arranged to further output a characterisation of the beamforming network as a sensitivity to changes in beamforming network parameters as a ratio between the first and second decoded signals.

8. A calibration system according to claim 7, wherein:

the first decoded signal $z_1(e,f)$ for element e of the beamforming network, at frequency f, is represented by:

$$z_1(e, f) = 1/2(1 - d^x e, f)) \cdot a(e, f);$$

the second decoded signal, $z_2(e,f)$ is represented by:

$$z_2(e, f) = 1/2(1 - d^x(e, f)) \cdot d^y(e, f) \cdot a(e, f),$$

and the sensitivity, $\tilde{d^y}(e)$, to changes in beamforming network parameters is represented by:

$$\tilde{d^y}(e) = \frac{z_2(e)}{z_1(e)}$$

wherein $\tilde{d^y}(e,f)$ is the difference of the complex gain of the beamforming network between a reference setting and after toggling bit x of the matrix, $\tilde{d^y}(e,f)$ is the difference of the complex gain of the beamforming network between the reference setting and the setting with a y offset to a gain or phase coefficient in the second plurality of settings; and $\tilde{d^y}(e,f)$ is a reference transfer function for a system comprising the satellite payload and its downlink.

9. A calibration system according to claim 7, wherein the processor is arranged to execute a synchronisation routine in order to determine when to start the calibration procedure.

10. A calibration system according to claim 7, wherein the processor is arranged to correct for gain and phase drift in the beamforming network by adjusting one or more parameters of the beamforming network in accordance with the sensitivity.

11. A system comprising the calibration system of claim 7 and a satellite payload, wherein the satellite payload comprises:
an array of transmit elements;
a calibration tone generator; and
one or more beamforming networks arranged to control the array of transmit elements in accordance with a plurality of settings;
wherein the transmit array is arranged to transmit, to the calibration system:
the reference signal corresponding to a calibration signal generated by the calibration tone generator; and
the encoded signal comprising a sequence of signals defined by the application of the orthogonal, bipolar, invertible matrix to the calibration signal;
wherein the one or more beamforming networks are arranged to apply the offset to one or more of the first plurality of settings to configure the second plurality of settings.

12. A system according to claim 11 wherein the transmit array is arranged to output a pseudo-random sequence in the encoded signal for synchronisation with the calibration system; and wherein the processor of the calibration system is arranged to observe the pseudo-random sequence in the encoded signal.

* * * * *

UNITED STATES PATENT AND TRADEMARK OFFICE
CERTIFICATE OF CORRECTION

PATENT NO. : 11,476,575 B2
APPLICATION NO. : 17/620173
DATED : October 18, 2022
INVENTOR(S) : Esteban Laria et al.

It is certified that error appears in the above-identified patent and that said Letters Patent is hereby corrected as shown below:

In the Claims

In Column 11, Line 59, this should read:
-- $z_1(e,f) = \frac{1}{2}(1 - d^x(e,f)) \cdot a(e,f)$; --
Instead of:
"$z_1(e,f) = \frac{1}{2}(1 - d^x e,f)) \cdot a(e,f)$;"

In Column 11, Line 64, this should read:
-- $z_2(e,f) = \frac{1}{2}(1 - d^x(e,f)) \cdot d^y(e,f) \cdot a(e,f)$, --
Instead of:
"$z_2(e,j) = \frac{1}{2}(1 - d^x(e,f)) \cdot d^y(e,f) \cdot a(e,f)$,"

In Column 12, Line 9, this should read:
-- wherein $d^x(e,f)$ is the difference of the complex gain of --
Instead of:
"wherein $\tilde{d}^y(e,f)$ is the difference of the complex gain of"

In Column 12, Line 13, this should read:
-- $d^y(e,f)$ is the difference of the complex gain of the --
Instead of:
"$\tilde{d}^y(e,f)$ is the difference of the complex gain of the"

In Column 12, Line 17, this should read:
-- $a(e,f)$ is a reference transfer function for a system --
Instead of:
"$\tilde{d}^y(e,f)$ is a reference transfer function for a system"

In Column 13, Line 11, this should read:
-- $z_1(e,f) = \frac{1}{2}(1 - d^x(e,f)) \cdot a(e,f)$; --

Signed and Sealed this
Twentieth Day of December, 2022

*Katherine Kelly Vidal*
Katherine Kelly Vidal
*Director of the United States Patent and Trademark Office*

CERTIFICATE OF CORRECTION (continued)
U.S. Pat. No. 11,476,575 B2

Instead of:
"$z_1(e,f) = \frac{1}{2}(1 - d^x e,f)) \cdot a(e,f);$"

In Column 13, Line 18, this should read:
-- $z_2(e,f) = \frac{1}{2}(1 - d^x(e,f)) \cdot d^y(e,f) \cdot a(e,f)$, --
Instead of:
"$z_2(e,j) = \frac{1}{2}(1 - d^x(e,f)) \cdot d^y(e,f) \cdot a(e,f),$"

In Column 13, Line 30, this should read:
-- wherein $d^x(e,f)$ is the difference of the complex gain of --
Instead of:
"wherein $\tilde{d}^y(e,f)$ is the difference of the complex gain of"

In Column 13, Line 33, this should read:
-- $d^y(e,f)$ is the difference of the complex gain of --
Instead of:
"$\tilde{d}^y(e,f)$ is the difference of the complex gain of"

In Column 14, Line 1, this should read:
-- $a(e,f)$ is a reference transfer function of a system --
Instead of:
"$\tilde{d}^y(e,f)$ is a reference transfer function of a system"